United States Patent [19]

Kimura et al.

[11] Patent Number: 4,783,294
[45] Date of Patent: Nov. 8, 1988

[54] PROCESS FOR PREPARING FOAMED ARTICLE OF VINYL CHLORIDE RESIN CONTAINING A LARGE AMOUNT OF INORGANIC PARTICLES

[75] Inventors: Yoshihiro Kimura, Osaka; Hisao Shimazu, Settsu; Tadayuki Saito, Osaka, all of Japan

[73] Assignee: Kanegafuchi Kagaku Kogyo Kabushiki Kaisha, Osaka, Japan

[21] Appl. No.: 744,174

[22] Filed: Jun. 13, 1985

[30] Foreign Application Priority Data

Jun. 14, 1984 [JP] Japan ............................. 59-122715
Jun. 4, 1985 [JP] Japan ............................. 60-120791

[51] Int. Cl.$^4$ ......................... C08J 9/04; B29C 67/22
[52] U.S. Cl. ............................. 264/45.3; 264/53; 264/54
[58] Field of Search ........................ 264/45.3, 53, 54

[56] References Cited

U.S. PATENT DOCUMENTS

| 3,911,070 | 10/1975 | Lundsager | 264/45.3 X |
| 3,927,159 | 12/1975 | Tomikawa et al. | 264/45.3 |
| 4,046,846 | 9/1977 | Fujimori | 264/45.3 |
| 4,049,593 | 9/1977 | Sato et al. | 264/45.3 X |

FOREIGN PATENT DOCUMENTS

| 0074035 | 3/1983 | European Pat. Off. |
| 2021615 | 11/1971 | Fed. Rep. of Germany |
| 2245705 | 4/1975 | France |
| 59-190836 | 10/1984 | Japan |
| 59-215331 | 12/1984 | Japan |
| 59-217661 | 12/1984 | Japan |

Primary Examiner—Philip Anderson
Attorney, Agent, or Firm—Armstrong, Nikaido, Marmelstein & Kubovcik

[57] ABSTRACT

A process for preparing a foamed article of a vinyl chloride resin containing a large amount of inorganic particles, which comprises the steps of preparing a foamable composition of the resin, the inorganic particles and a blowing agent, filling a closable mold with the composition, heating the mold and the composition under pressure, and opening the mold at a temperature of not less than a softening temperature of the resin in the foamable composition. According to the process, a foamed article which has an excellent mechanical property and a high expansion ratio, and produces little calorie, smoke and poison gas can be prepared with reduced energy consumption and in a shortened production time.

7 Claims, 1 Drawing Sheet

PROCESS FOR PREPARING FOAMED ARTICLE OF VINYL CHLORIDE RESIN CONTAINING A LARGE AMOUNT OF INORGANIC PARTICLES

BACKGROUND OF THE INVENTION

The present invention relates to a process for preparing a foamed article of a vinyl chloride resin containing particles of an inorganic material. According to the process of the present invention, a foamed article generates little heat and produces little smoke and little poison gas at burning can be obtained easily and inexpensively.

Heretofore, a foamed article of a vinyl chloride resin (hereinafter referred to as "PVC") is prepared by the following processes.

(1) High-pressure two-expansion step process

A foamable composition of the PVC, a blowing agent and a stabilizer are packed into a closable mold directly or in a form of a pre-formed material such as a rolled sheet, heated under pressure, and then cooled to a temperature near normal temperature while keeping the inner pressure high to prepare a primary foamed article. The primary foamed article then is taken out from the mold, and heated again with hot air or hot water to carry out secondary expansion.

(2) Crosslinking process

A foamable composition of the PVC, a chemical blowing agent, an isocyanate and an acid anhydride are subjected to the same procedures as in the process (1) to produce a primary foamed article. The primary foamed article is secondarily expanded by heating again with hot water or steam to cause at crosslinking reaction amoung the isocyanate, the acid anhydride and water.

(3) Extrusion process

A composition of the PVC, an acrylic processing aid and a nucleating agent is introduced to an extruder and melted by heating. To the molten composition in the extruder is added a physical blowing agent to give expandability, and then the foamable composition is extruded to carry out expansion.

(4) Elastomer process

A gas-containing PVC plastisol is prepared by mechanically absorbing an inert gas such as carbon dioxide gas into a PVC plastisol with agitation under pressure at a low temperature. The gas-containing PVC plastisol is expanded by high frequency heating method or the like.

According to the conventional processes, a good foamed article containing a large amount of particles of an inorganic material cannot be economically obtained because processability of the composition and the primary foamed article is remarkably lowered.

For instance, in Japanese Examined Patent Publication (Tokkyo Kokoku) Nos. 26776/1977 and 7944/1978, there are disclosed processes for preparing a foamed article of the PVC containing a large amount of the inorganic material according to a modified process of the high pressured two-expansion-step process (1). In those processes, however, since there are employed the fundamental procedure of the process (1) where a primary foamed article is taken out from a cooled mold and then is secondarily expanded by re-heating, temperature inclination, i.e., a temperature near the surface area being high and a temperature being low toward the center, occurs in the foamed article at the secondary expansion step, which results in difference of expansion speed between the surface area and the center area. As a result, the obtained foamed article shrinks and defoams and, in an extreme case, the surface portion is peeled off of itself. Further, a large amount of a cooling medium is required since the primary foamed article must be cooled to normal temperature. In addition, the mold and a press plate used for heating are also cooled as a result of the cooling procedure. Accordingly energy consumption for re-heating the mold and the press plate is increased. Furthermore, this cooling and re-heating cycle takes more time, which results in prolongation of production time and in decrease of productivity. Moreover, considerably more calories are required for the secondary expansion procedure.

As mentioned above, the conventional processes such as the processes described in Japanese Examined Patent Publication (Tokkyo Kokoku) Nos. 26776/1977 and 7944/1978 are insufficient and disadvantageous in productivity, economy and quality of the product.

Also, in the conventional processes mentioned above, the foamable composition or plastisol is prepared by complicated procedures such that two separated kneading procedures are required or kneading procedure must be carried out at an elevated temperature.

An object of the present invention is to provide a process for preparing a high quality foamed article of PVC containing a large amount of particles of an inorganic material economically and with high productivity.

SUMMARY OF THE INVENTION

According to the present invention, there is provided a process for preparing a foamed article of a PVC containing a large amount of particles of an inorganic material, which comprises the steps of (1) preparing a foamable composition by kneading a mixture comprising the PVC, the particles of the inorganic material and a blowing agent at normal temperature under normal pressure, (2) filling a closable mold with the foamable composition, (3) heating the foamable composition and the mold under pressure, and (4) opening the mold at a temperature of not less than a softening temperature of the PVC in the foamable composition to expand the foamable composition.

According to the process, the secondary expansion procedure is not required because when the mold is opened at a temperature of not less than the softening temperature of the PVC the foamable composition can be expanded from the center by utilizing the expansion force of the blowing agent. Furthermore, since the mold and the press plate are not too cooled, heat energy and time requirements for re-heating the equipments in the next production can be reduced. The foamed article obtained by the process of the present invention has good mechanical properties and has a reduced heat generation, reduced amount of smoke and reduced poison gas yield at burning because of a large content of the inorganic particles. Moreover according to the present invention, particular techniques are not required for the preparation of the foamable composition, but the composition can be prepared by kneading all components at the same time by using ordinary equipments under normal pressure at normal temperature.

DETAILED DESCRIPTION OF THE INVENTION

Figure 1:
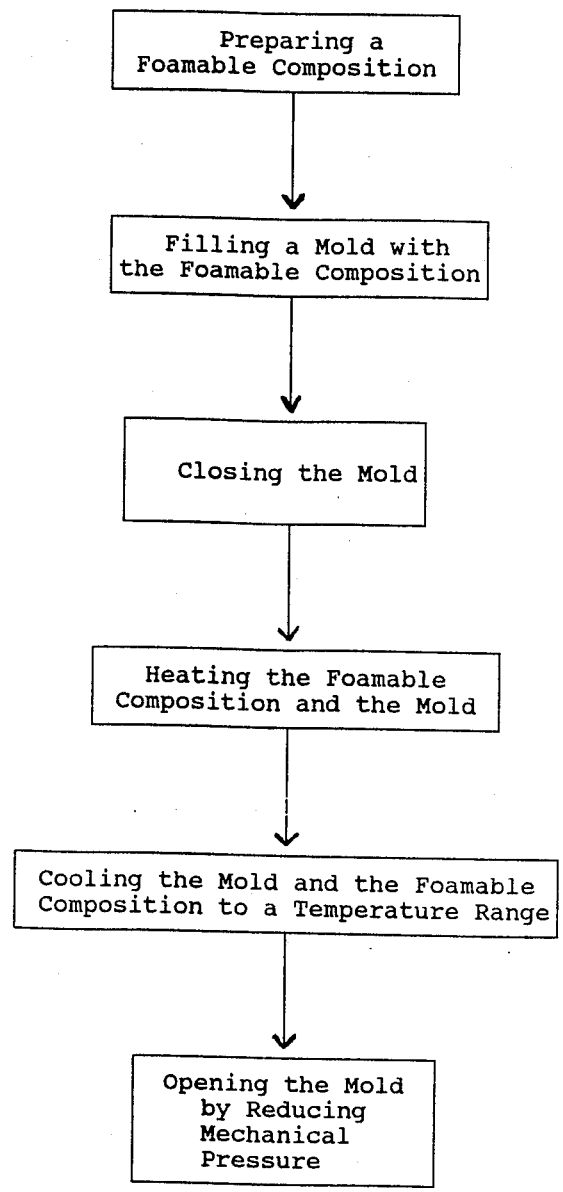
FIG. 1 is a flow sheet identifying the steps of the applicants' process.

The PVC used in the present invention is polyvinyl chloride or a mixed resin composition containing polyvinyl chloride of a content of not less than 50% (% by weight, hereinafter the same). Examples of the resin which is mixed with polyvinyl chloride are, for instance, chlorinated polyvinyl chloride, vinyl chloride-vinyl acetate copolymer, thermoplastic polyurethane, acrinitrile butadiene rubber (NBR), chlorinated polyethylene, methacrylate-acrylate copolymer, a resin which is compatible with polyvinyl chloride, an admixture thereof, and the like.

Available polyvinyl chloride is a so-called paste resin having an average particle size of 0.2 to 5 μm, preferably 0.5 to 2.0 μm. When admixing the paste resin with the other resin, the amount of the paste resin in the mixed resin composition should be not less than 50%.

The inorganic particles used in the present invention is not particularly limited and preferably have an average particle size of about 0.01 to 300 μm, particularly 0.01 to 150 μm. In view of cost and commercial availability, preferable inorganic materials are, for instance, calcium carbonate, talc, aluminium hydroxide, magnesium hydroxide, asbestos, rock wool, hollow shirasu balloon, an admixture thereof, and the like. The inorganic particles are preferably treated with a coupling agent such as a silane compound, a titanate compound or an aliphatic acid compound, because the surface treated particles are improved in compatibility with the PVC. A weight ratio of PVC/inorganic particles is 70/30 to 5/95, preferably 50/50 to 10/90, most preferably 40/60 to 20/80.

The blowing agent used in the present invention is a physical blowing agent or a chemical blowing agent. As the physical blowing agent, there can be employed a compound having a boiling point of less than the softening temperature of the PVC in the foamable composition. Examples of such a compound are, for instance, an aliphatic hydrocarbon such as propane, n-butane, isobutane, n-pentane, iso-pentane or neo-pentane; a halogenated aliphatic hydrocarbon such as methyl chloride, methylene chloride, trichloroethylene, trichlorofluoromethane or dichlorodifluoromethane. As the chemical blowing agent, there, can be employed, for instance, azodicarbonamide, azobisisobutylnitrile, diazoaminobenzene, N,N'-dinitrosopentamethylenetetramine, p-toluenesulfonylhydrazide, an admixture thereof, and the like.

An amount of the blowing agent depends on the desired expansion ratio and the kind of the blowing agent. In case of the physical blowing agent, there is employed in general 2 to 60 parts (parts by weight, hereinafter the same), preferably 5 to 40 parts on the basis of 100 parts of the total amount of the PVC and the inorganic particles. In case of the chemical blowing agent, there is employed in general 0.1 to 50 parts, preferably 1 to 30 parts on the basis of 100 parts of the total amount of the PVC and the inorganic particles. In case of using both of the physical blowing agent and the chemical blowing agent, there is employed in general 2 to 50 parts, preferably 5 to 30 parts of the physical blowing agent and 0.1 to 30 parts, preferably 0.1 to 10 parts of the chemical blowing agent. When using the chemical blowing agent, a foaming assistant may be used. For producing a foamed article having a high expansion ratio, the chemical blowing agent is preferably employed because of low gas permiability coefficient. Particularly, a chemical blowing agent which produces nitrogen gas as a decomposition gas is preferable, because nitrogen gas has an extremely low gas permiability coefficient.

In the present invention, it is preferable to use a solvent which dissolves or swells the PVC. Examples of the solvents are, for instance, an ester such as isoamyl formate or n-butyl acetate; an polyhydric alcohol derivative such as ethyl cellosolve or ethyl cellosolve acetate; a ketone such as di-iso-butyl ketone or methyl iso-butyl ketone; an aromatic hydrocarbon such as benzene, toluene, xylene or ethylbenzene; a halogenated hydrocarbon such as chlorobenzene or carbon tetrachloride; a carbonate such as diethyl carbonate; a phosphate such as tricresyl phoshate; an admixture thereof; and the like. The solvent may be used in an amount of not more than about 100 parts, preferably 10 to 70 parts, based on 100 parts of the total amount of the PVC and the inorganic particles.

Further, if necessary, additions such as a plasticizer and a pigment may be added.

The process of the present invention is more specifically explained hereinbelow.

First, given amounts of the above-mentioned components are admixed at the same time and kneaded under normal pressure at normal temperature to prepare the foamable composition. The admixing and kneading procedure can be carried out by using an ordinary machine such as a ribbon blender, a double arm kneader, a intensive kneader or a Banbury mixer.

With the foamable composition a closable mold made of an aluminium alloy or the like is filled, and then the foamable composition and the mold are heated under pressure with an ordinary machine such as a hydraulic hot press machine.

The condition of pressure and temperature at heating depends on kinds of the components of the composition and the optimum period of time, temperature and pressure are practically determined. As a result of the heating, however, it is necessary that the PVC must be melted and, in case of using the chemical blowing agent, the decomposition of the blowing agent has been substantially completed. The heating temperature is higher than the softening temperature and moreover a foaming temperature explained bellow, and is generally 130° to 210° C., preferably 170° to 190° C.

After the heating, the mold is cooled under pressure to a foaming temperature by cooling the heated press plate of the press machine with a cooling medium such as water.

The foaming temperature depends on kinds of the blowing agents and the like, and is lower than the heating temperature and is higher than the softening temperature of the PVC in the foamable composition. At the foaming temperature, the PVC has a melt viscosity such that a cell membrane of the foamed article is not broken and the produced gas from the blowing agent does not escape. In general, the foaming temperature is selected from a temperature range of 50° to 170° C. When using the physical blowing agent, the foaming temperature must be higher than a boiling point of the blowing agent.

The term "softening temperature" used in the specification and claims means a temperature at which the PVC can be elongated by expansion force produced from the blowing agent to an extent where a foamed article having a practically usable expansion ratio can be obtained. The practically usable expansion ratio depends on kind of the PVC, use of the foamed article, and the like. For instance, when the foamed article is used as a heat insulating material for an architectural material, the practically usable expansion ratio means an expansion ratio where the foamed article have an apparent density of not more than about 0.15 g/cm$^3$. The softening temperature of the PVC in the foamable composition is higher than normal temperature, and generally 30° to 150° C., preferably 40° 120° C.

When the mold is cooled to the foaming temperature, the mold is opened to release the content to an atomopheric pressure. At this time, since the content has an expansion force produced from the blowing agent and the PVC is maintained at a temperature of not less than the softening temperature, the content is rapidly expanded, and the expansion is completed in a short period of time to give the desired foamed article.

As mentioned above, according to the present invention, the desired foamed article can be easily prepared at one expansion step. If desired, the obtained foamed article may be re-heated.

The foamed article prepared according to the present invention has an expansion ratio of about 5 to 50 times, particularly, in case of using the chemical blowing agent, 20 to 50 times, and has an apparent density of 0.5 to 0.04 g/cm$^3$, which depends on the amount of the inorganic particles.

The present invention is more particularly described and explained by means of the following Examples. It is to be understood that the present invention is not limited to the Examples, and various changes and modifications may be made in the invention without departing from the spirit and scope thereof.

EXAMPLES 1 to 3

Five hundred grams of a foamable composition was prepared by using the materials shown in Table 1 in the mixing ratio shown in the same Table. The kneading procedure was carried out for 45 min under normal pressure with a closed double arm kneader having an effective volume of 1 l. During the kneading a temperature of the foamable composition was kept at a temperature of 15° to 20° C. by passing a cold water through the jacket of the kneader.

After the kneading the foamable composition was poured into a mold of an aluminium alloy (cavity size: 170 ×90×15 mm). The mold was covered with an aluminium plate and set in a hydraulic hot press machine. The temperature of the mold was raised from room temperature to 175° C. over 5 min while keeping the pressure of the machine at about 250 kg per 1 cm$^2$ of the surface area of the mold. After keeping the mold at 175° C. for 40 min, the mold was cooled to 100° C. over 6 min by passing a cold water through a cooling plate of the press machine. After keeping the mold at 100° C. for 10 min, the pressure applied to the mold was released to expand the foamable composition. The expansion was complated within 4 sec.

The obtained foamed article was evaluated by means of appearance, uniformity of cell size and cell distribution, and apparent density. The appearance and the uniformity of cell were judged by observing with naked eyes, and the apparent density was measured according to the following method. The results are shown in Table 1.

(Apparent density)

A test piece of 20 mm cubic was cut off from the foamed article and its volume and weight were measured $$\left( \text{apparent density} = \frac{\text{weight (g)}}{\text{volume (cm}^3\text{)}} \right).$$

COMPARATIVE EXAMPLE 1

A foamable composition was prepared and heated in the same manner as in Example 1. After heating at 175° C. for 40 min, the mold was cooled to 25° C. over 30 min, and then the mold was opened to take out the content (primary foamed article). The primary foamed article was heated again in an oven at 110° C. for about 30 min with hot air to obtain a secondary foamed article.

The secondary foamed article was foamed ununiformly and then shrinked to deform. Thus, an apparent density of the deformed article could not be measured. The results are shown in Table 1.

COMPARATIVE EXAMPLE 2

A primary foamed article was prepared in the same manner as in Comparative Example 1, and heated again at 97° C. in hot water for about 10 min. The foamed article was drastically expanded ununiformly, and then immediately shrinked. As a result, the surface layer of the foamed article was peeled off which causes its commercial value to be lost. The results are shown in Table 1.

The materials shown in Table 1 and other Tables are as follows:

Resin (Kane vinyl paste) PHS-660: Paste resin of polyvinyl chloride (average polymerization degree=2400, average particle size=1 μm) avairable from Kanegafuchi Kagaku Kogyo Kabushiki Kaisha (Kane vinyl paste) PHS-20: Paste resin of polyvinyl chloride (average polymerization degree=1700, average prticle size=1 μm) avairable from Kanegafuchi Kagaku Kogyo Kabushiki Kaisha (Kane vinyl paste) ES-300: Polyvinyl chloride (average polymerization degree=3600, trial product) avairable from Kanegafuchi Kagaku Kogyo Kabushiki Kaisha CPVC: Chlorinated polyvinyl chloride (average polymerization degree=700, chlorine content=66%) avairable from Kanegafuchi Kagaku Kogyo Kabushiki Kaisha (Kane vinyl paste) PCM-12: Vinyl chloride-vinyl acetate copolymer (average polymerization degree=1000, vinyl acetate content=7%) avairable from Kanegafuchi Kagaku Kogyo Kabushiki Kaisha Thermoplastic polyurethane: Avairable from Dainippon Ink & Chemicals, Inc.

NBR: Acrylonitrilebutadiene rubber (acrylonitrile content=41%) avairable from JSR Kabushiki Kaisha Inorganic particle Calcium carbonate: Particle size=70 from Nitto Funka Kogyo Kabushiki Kaisha.

Talc PK: Talc (average particle size=5.5 μm) avairable from Fuji Talc Kogyo Kabushiki Kaisha Asbestos: Yielded from Musori in South Africa avairable from C. Itoh & Co., Ltd.

Aluminium hydroxide: Avairable from Showa Keikinzoku Kabushiki Kaisha.

Antimony oxide: Avairable from Mikuni Seiren Kabushiki Kaisha.

Super SSS: Heavy calcium carbonate (average particle size =3.5 μm) avairable from Maruo Calcium Co., Ltd.

Physical blowing agent

Fleon 11: Trichlorofluoromethane avairable from Mitsui Fluorochemical Co., Ltd.

Butane: Avairable from Sumisho Ekikagasu Kabushiki Kaisha.

Chemical blowing agent

AZCA: Azodicarbonamide avairable from Otsuka Chemical Co., Ltd.

AIBN: Azobisisobutyronitrile avairable from Otsuka Chemical Co., Ltd.

DPT: Dinitrosopentamethylenetetramine avairable from Eiwa Kasei Kogyo Kabushiki Kaisha.

Cell paste: Foaming asisstant avairable from Eiwa Kasei Kogyo Kabushiki Kaisha

Solvent

| | |
|---|---|
| Toluene: | Avairable from Wako Junyaku Kogyo Kabushiki Kaisha. |
| n-Butyl acetate: | Avairable from Wako Junyaku Kogyo Kabushiki Kaisha. |
| Ethyl cellosolve: | Avairable from Wako Junyaku Kogyo Kabushiki Kaisha. |
| Diisobutyl ketone: | Avairable from Wako Junyaku Kogyo Kabushiki Kaisha. |
| Ethylbenzene: | Avairable from Wako Junyaku Kogyo Kabushiki Kaisha. |
| Diethyl carbonate: | Avairable from Wako Junyaku Kogyo Kabushiki Kaisha. |
| CRP: | Plasticizer (trisdichloropropylphosphate) avairable from Kabushiki Kaisha Daihachi Kagaku Kogyosho. |

Stabilizer

DBL: Dibasic lead stearate avairable from Katsuta Kako Kabushiki Kaisha.

Coupling agent

TTS: Isopropyltrisstearoyl titanate avairable from Nippon Soda Co., Ltd.

EXAMPLES 4 to 21

Five handred grams of a foamable composition was prepared by using the materials shown in Talbe 2 in the mixing ratio shown in the same Table. The kneading procedure was carried out for 45 min under normal pressure with a closed double arm kneader having an effective volume of 1 . During the kneading a temperature of the foamable composition was kept at a temperature of 15 to 20° C. by passing a cold water through the jacket of the kneader.

After the kneading, the foamable composition was poured into a mold of an aluminium alloy (cavity size: 170×90×15 mm). The mold was covered with an aluminium plate and set in a hydraulic hot press machine. The temperature of the mold was raised from room temperature to 175° C. over 10 min while keeping the pressure of the machine at about 250 kg per 1 $cm^2$ of the surface area of the mold. After keeping the mold at 175° C. for 35 min, the mold was cooled to a foaming temperature shown in Table 2 over about 10 min by passing a cold water through a cooling plate of the press machine. After keeping the mold at the foaming temperature for 10 min, the pressure applied to the mold was released to expand the foamable composition. The expansion was completed within about 1 sec.

The obtained foamed article was evaluated by means of appearance, uniformity of cell size and cell distribution, apparent density, expansion ratio, percentage of closed cell and efficiency of blowing agent. The appearance and the uniformity of cell were judged by observing with naked eyes, and the apparent density was measured in the same manner as in Example 1. The expansion ratio, the percentage of closed cell and the efficiency of blowing agent were measured according to the following methods.

The results are shown in Table 3.

(Expansion ratio)

Calculated by dividing a density of the solid content (PVC and inorganic particle) in the foamable composition by the apparent density of the foamed article.

(Percentage of closed cell)

Measured according to ASTM D 2856 C with an air comparison type aerometer manufactured by Toshiba Beckmann Kabushiki Kaisha.

(Efficiency of blowing agent)

Calculated according to the following equations.

TABLE 1

| | | Formable Composition (parts by weight) | | | | | Property | | |
|---|---|---|---|---|---|---|---|---|---|
| | | Inorganic | Blowing agent | | | Stabi- | Appea- | Cell uni- | Apparent density |
| Ex. | Resin | partile | Physical | Chemical | Solvent | lizer | rance | formity | (g/cm³) |
| Ex. 1 | PSH-20 (22) | Talc PK (78) | Fleon 11 (15) | AZCA(1) AIBN(1) | Toluene (40) | DBL (3) | Good | Good | 0.15 |
| Ex. 2 | PSH-20 (30) | Talc PK(35) SuperSSS(35) | Fleon 11 (10) | AZCA(2) | Toluene (47) | DBL (3) | Good | Good | 0.25 |
| Ex. 3 | PSH-660 (15) | Talc PK(50) SuperSSS(20) Asbestos(15) | Butane (15) | AZCA(1) AIBN(1) | Toluene (40) | DBL (3) | Good | Good | 0.15 |
| Com. Ex. 1 | PSH-20 (22) | Talc PK (78) | Fleon 11 (15) | AZCA(1) AIBN(1) | Toluene (40) | DBL (3) | Deformed | Bad | Hard to measure |
| Com. Ex. 2 | PSH-20 (22) | Talc PK (78) | Fleon 11 (15) | AZCA(1) AIBN(1) | Toluene (40) | DBL (3) | Remarkably deformed | Bad | Hard to measure |

Theoretical density of foamed article$(T) = x/(X + Y + Zt)$

Apparent density of foamed article$(A) = x/(X + Y + Za)$

Efficiency of blowing agent(%) =

$$Za/Zt \times 100 = \left(\frac{X}{A} - X - Y\right)/\left(\frac{X}{T} - X - Y\right) \times 100$$

wherein x and X are weight (g) and volume (ml) of the solid content of the foamed article, respectively, Y is a volume (ml) of the solvent in the foamed article, Zt is a theoritical volume (ml) of the produced gas, and Za is an effective volume (ml) for the practical expansion.

COMPARATIVE EXAMPLE 3

A foamable composition was prepared and heated in the same manner as in Example 21. After heating at 175° C. for 35 min, the mold was cooled to 25° C. over 30 min, and then the mold was opened to take out the content (primary foamed article). The primary foamed article was heated again in an oven at 90° C. for about 60 min with hot air. The primary foamed aritcle was slowly expanded at a low rate, and the obtained foamed article had a large apparent density and the efficiency of foaming agent was low.

The appearance, uniformity of cell, apparent density, expansion ratio, percentage of closed cell and efficiency of blowing agent were measured in the same manner as in Example 4. The results are shown in Table 3.

COMPARATIVE EXAMPLE 4

The procedures in Example 4 were repeated except that butane was employed as a foaming agent. After heating at 175° C. for 35 min in the press machine, the mold was cooled to 20° C. over 45 min, and then mold was opened to take out the content (primary foamed article). The primary foamed article was heated again in an oven at 100° C. for about 30 min with hot air. The obtained foamed article had a large hollow at the center of the article.

The appearance, uniformity of cell, apparent density, expansion ratio, percentage of closed cell and efficiency of blowing agent were measured in the same manner in Example 4. The results are shown in Table 3.

COMPARATIVE EXAMPLE 5

The same procedures in Example 4 were repeated except that the mold was opened at 20° C. The obtained foamed article had a good appearance, but had a low expansion ratio, i.e. twice.

The appearance, uniformity of cell, apparent density, expansion ratio, percentage of closed cell and efficiency of blowing agent were measured in the same manner as in Example 4. The results are shown in Table 3.

TABLE 2

| Example | Foamable composition (parts by weight) | | | | | | | Foaming temperature (°C.) |
|---|---|---|---|---|---|---|---|---|
| | Resin | Inorganic particle | Blowing agent | | Solvent | Stabilizer | Coupling agent | |
| | | | Physical | Chemical | | | | |
| 4 | PSH-660 (100) | Calcium carbonate (100) Talc PK(100) | — | AIBN(19) AZCA(1) | Toluene (125) | DBL (6) | — | 100 |
| 5 | PSH-20 (100) | Calcium carbonate (100) Talc PK(100) | — | AIBN(19) AZCA(1) | Toluene (125) | DBL (6) | — | 75 |
| 6 | ES-300 (100) | Calcium carbonate (100) Talc PK(100) | — | AIBN(19) AZCA(1) | Toluene (125) | DBL (6) | — | 120 |
| 7 | PSH-660(90) CPVC(10) | Calcium carbonate (100) Talc PK(100) | — | AIBN(19) AZCA(1) | Toluene (125) | DBL (6) | — | 100 |
| 8 | PSH-660(90) PCM-12(10) | Calcium carbonate (100) Talc PK(100) | — | AIBN(19) AZCA(1) | Toluene (125) | DBL (6) | — | 100 |
| 9 | PSH-660(90) Thermoplastic polyurethane (10) | Calcium carbonate (100) Talc PK(100) | — | AIBN(19) AZCA(1) | Toluene (125) | DBL (6) | — | 100 |
| 10 | PSH-600 (70) NBR(30) | Calcium carbonate(100) Talc PK(100) | — | AIBN(19) AZCA(1) | Toluene (100) | DBL (6) | — | 90 |
| 11 | PSH-660 (100) | Calcium carbonate(100) Talc PK(100) | — | AIBN(19) AZCA(1) | Toluene (80) | DBL (6) | TTS (6) | 110 |
| 12 | PSH-660 (100) | Calcium carbonate(190) Talc PK(120) Asbestos(40) | — | AIBN(21) AZCA(1) DPT(3) Cell paste(3) | Toluene (300) | DBL (6) | — | 50 |
| 13 | PSH-660 (100) | Calcium carbonate(37) Talc PK(37) Asbestos(26) Aluminium hydroxide(50) Antimony oxide(5) | — | AIBN(20) AZCA(1) DPT(3) Cell paste(3) | Toluene (150) | DBL (5) | — | 75 |
| 14 | PSH-660 | Asbestos(50) | — | AIBN(20) | Toluene | DBL | — | 70 |

TABLE 2-continued

| Example | Resin | Inorganic particle | Blowing agent Physical | Blowing agent Chemical | Solvent | Stabilizer | Coupling agent | Foaming temperature (°C.) |
|---|---|---|---|---|---|---|---|---|
| | (100) | Aluminium hydroxide(100) Antimony oxide (5) | | AZCA(1) DPT(3) Cell paste(3) | (150) | (5) | | |
| 15 | PSH-660 (100) | Calcium carbonate(100) Talc PK(100) | — | AIBN(19) AZCA(1) | n-Butyl acetate (125) | DBL (6) | — | 100 |
| 16 | PSH-660 (100) | Calcium carbonate(100) Talc PK(100) | — | AIBN(19) AZCA(1) | Ethyl cellosolve (125) | DBL (6) | — | 110 |
| 17 | PSH-660 (100) | Calcium carbonate(100) Talc PK(100) | — | AIBN(19) AZCA(1) | Diisobutyl ketone(125) | DBL (6) | — | 110 |
| 18 | PSH-660 (100) | Calcium carbonate(100) Talc PK(100) | — | AIBN(19) AZCA(1) | Ethylbenzene (125) | DBL (6) | — | 110 |
| 19 | PSH-660 (100) | Calcium carbonate(100) Talc PK(100) | — | AIBN(19) AZCA(1) | Diethyl carbonate (125) | DBL (6) | — | 110 |
| 20 | PSH-660 (100) | Calcium carbonate(100) Talc PK(100) | — | AIBN(19) AZCA(1) | Toluene(100) CRP(25) | DBL (6) | — | 100 |
| 21 | PSH-660 (100) | Calcium carbonate(87.5) Talc PK(87.5) Asbestos(25) | — | AIBN(15) AZCA(1) DPT(8.5) Cell paste(8.5) | Toluene (170) | DBL (6) | — | 85 |
| Com. Ex. 3 | PSH-660 (100) | Calcium carbonate(87.5) Talc PK(87.5) Asbestos(25) | — | AIBN(15) AZCA(1) DPT(8.5) Cell paste(8.5) | Toluene (170) | DBL (6) | — | — |
| Com. Ex. 4 | PSH-660 (100) | Calcium carbonate (100) Talc PK(100) | Butane (7) | — | Toluene (125) | DBL (6) | — | 100 |
| Com. Ex. 5 | PSH-660 (100) | Calcium carbonate (100) Talc PK(100) | — | AIBN(19) AZCA(1) | Toluene (125) | DBL (6) | — | 20 |

TABLE 3

| Example | Appearance | Uniformity of cell | Apparent density (g/cm³) | Expansion ratio | Percentage of closed cell (%) | Efficiency of blowing agent (%) |
|---|---|---|---|---|---|---|
| 4 | Good | Good | 0.088 | 24 | 78 | 81 |
| 5 | Good | Good | 0.094 | 22 | 72 | 79 |
| 6 | Good | Good | 0.090 | 23 | 85 | 75 |
| 7 | Good | Good | 0.079 | 26 | 87 | 90 |
| 8 | Good | Good | 0.080 | 26 | 82 | 90 |
| 9 | Good | Good | 0.080 | 26 | 83 | 90 |
| 10 | Good | Good | 0.088 | 23 | 77 | 83 |
| 11 | Good | Good | 0.085 | 25 | 81 | 85 |
| 12 | Good | Good | 0.095 | 24 | 83 | 92 |
| 13 | Good | Good | 0.062 | 32 | 83 | 83 |
| 14 | Good | Good | 0.059 | 34 | 77 | 89 |
| 15 | Good | Good | 0.087 | 24 | 89 | 81 |
| 16 | Good | Good | 0.100 | 21 | 86 | 68 |
| 17 | Good | Good | 0.087 | 24 | 92 | 80 |
| 18 | Good | Good | 0.082 | 25 | 89 | 85 |
| 19 | Good | Good | 0.080 | 26 | 85 | 87 |
| 20 | Good | Good | 0.092 | 23 | 85 | 78 |
| 21 | Good | Good | 0.061 | 34 | 79 | 81 |
| Com. Ex. 3 | Good | Good | 0.093 | 22 | 70 | 51 |
| Com. Ex. 4 | Hollow produced | Ununiform | Hard to measure | Hard to measure | Hard to measure | Hard to measure |
| Com. Ex. 5 | Good | Good | 0.90 | 2 | Hard to measure | 2 |

What we claim is:

1. A process for preparing a foamed article of a vinyl chloride resin containing a large amount of particles of an inorganic material, which comprises the steps of,
    (1) preparing a foamable composition by kneading a mixture comprising a vinyl chloride resin, particles of an inorganic material, a blowing agent and a solvent at normal temperature under normal pressure,
    (2) filling a closable mold having an opening with the foamable composition,
    (3) closing the mold with a cover, (4) heating the foamable composition and the mold while the cover is mechanically pressed to melt the vinyl chloride resin and to decompose the blowing agent, (5) cooling the mold to maintain the temperature of the foamable composition within the range of 50° C. to 170° C., and (6) opening the mold at a temperature of not less than a softening temperature of the vinyl chloride by reducing the mechanical pressure to expand the foamable composition.

2. The process of claim 1, wherein the vinyl chloride resin is polyvinyl chloride or a mixed resin composition which contains polyvinyl chloride at an amount of not less than 50% by weight.

3. The process of claim 2, wherein the mixed resin comprises one or more members selected from the group consisting of vinyl chloride-vinyl acetate copolymer, chlorinated polyvinyl chloride, thermoplastic polyurethane, acrylonitrilebutadiene copolymer, chlorinated polyethylene, methacrylateacrylate copolymer, ethylene-vinyl acetate copolymer, vinyl chloride-vinylidene chloride copolymer.

4. The process of claim 1, wherein the inorganic particles are surface-treated with a coupling agent selected from the group consisting of a titanate coupling agent, a silane coupling agent and an aliphatic acid coupling agent.

5. The process of claim 1, wherein the blowing agent is a chemical blowing agent.

6. The process of claim 5, wherein the chemical blowing agent produces nitrogen gas at thermal decomposition.

7. The process of claim 1, wherein the solvent is one or more members selected from the group consisting of an ester, a polyhydric alcohol derivative, a ketone, an aromatic hydrocarbon, a halogenated hydrocarbon, a carbonate, a phosphate.

* * * * *